United States Patent
Parikh et al.

(10) Patent No.: US 10,374,971 B2
(45) Date of Patent: *Aug. 6, 2019

(54) LOAD ADAPTATION ARCHITECTURE FRAMEWORK FOR ORCHESTRATING AND MANAGING SERVICES IN A CLOUD COMPUTING SYSTEM

(71) Applicant: AT&T Intellectual Property I, LP, Atlanta, GA (US)

(72) Inventors: Anisa Parikh, Holmdel, NJ (US); Siroos K. Afshar, Englishtown, NJ (US); Paritosh Bajpay, Edison, NJ (US); Pradeep Khowash, Dallas, TX (US); Reuben Klein, East Brunswick, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 33 days.

This patent is subject to a terminal disclaimer.

(21) Appl. No.: 15/681,498

(22) Filed: Aug. 21, 2017

(65) Prior Publication Data
US 2017/0373986 A1    Dec. 28, 2017

Related U.S. Application Data

(63) Continuation of application No. 14/464,212, filed on Aug. 20, 2014, now Pat. No. 9,742,690.

(51) Int. Cl.
*H04L 12/911* (2013.01)
*H04L 12/923* (2013.01)
(Continued)

(52) U.S. Cl.
CPC ........ *H04L 47/762* (2013.01); *H04L 43/0811* (2013.01); *H04L 47/125* (2013.01);
(Continued)

(58) Field of Classification Search
CPC .... G06F 11/3006; G06F 21/577; H04L 41/50; H04L 43/0817; H04L 63/1416;
(Continued)

(56) References Cited

U.S. PATENT DOCUMENTS 7,466,710 B1    12/2008    Clemm et al.
7,574,496 B2    8/2009    Mccrory et al.
(Continued)

OTHER PUBLICATIONS

U.S. Office Action dated Nov. 17, 2017 in U.S. Appl. No. 14/464,222.
(Continued)

*Primary Examiner* — Le H Luu
(74) *Attorney, Agent, or Firm* — Hartman & Citrin LLC

(57) ABSTRACT

According to one aspect of the concepts and technologies disclosed herein, a cloud computing system can include a load adaptation architecture framework that performs operations for orchestrating and managing one or more services that may operate within at least one of layers 4 through 7 of the Open Systems Interconnection ("OSI") communication model. The cloud computing system also can include a virtual resource layer. The virtual resource layer can include a virtual network function that provides, at least in part, a service. The cloud computing system also can include a hardware resource layer. The hardware resource layer can include a hardware resource that is controlled by a virtualization layer. The virtualization layer can cause the virtual network function to be instantiated on the hardware resource so that the virtual network function can be used to support the service.

20 Claims, 6 Drawing Sheets

(51) Int. Cl.
*H04L 12/803* (2013.01)
*H04L 12/917* (2013.01)
*H04L 12/26* (2006.01)

(52) U.S. Cl.
CPC .............. *H04L 47/76* (2013.01); *H04L 47/78* (2013.01); *H04L 47/782* (2013.01); *H04L 47/788* (2013.01); *H04L 47/828* (2013.01); *H04L 43/0876* (2013.01)

(58) Field of Classification Search
CPC ..... H04L 67/1095; H04L 47/76; H04L 47/78; H04L 47/782; H04L 47/788; H04L 47/828; H04L 47/125; H04L 43/0811; H04L 43/0876
See application file for complete search history.

(56) References Cited

U.S. PATENT DOCUMENTS

| | | | |
|---|---|---|---|
| 7,603,671 | B2 | 10/2009 | Liu |
| 7,818,002 | B2 | 10/2010 | Bajko et al. |
| 7,869,364 | B2 | 1/2011 | Griffith et al. |
| 8,032,413 | B2 | 10/2011 | Carlson |
| 8,190,740 | B2 | 5/2012 | Stienhans et al. |
| 8,209,415 | B2 | 6/2012 | Wei |
| 8,218,557 | B2 | 7/2012 | Kean et al. |
| 8,244,559 | B2 | 8/2012 | Horvitz et al. |
| 8,250,215 | B2 | 8/2012 | Stienhans et al. |
| 8,271,653 | B2 | 9/2012 | Dehaan |
| 8,276,140 | B1 | 9/2012 | Beda et al. |
| 8,433,802 | B2 | 4/2013 | Head et al. |
| 8,514,868 | B2 | 8/2013 | Hill |
| 8,515,433 | B2 | 8/2013 | Vaswani et al. |
| 8,572,612 | B2 | 10/2013 | Kern |
| 8,606,878 | B2 | 12/2013 | Ferris |
| 8,615,745 | B2 | 12/2013 | Blainey et al. |
| 8,615,746 | B2 | 12/2013 | Blainey et al. |
| 8,656,019 | B2 | 2/2014 | Chikando et al. |
| 8,700,946 | B2 | 4/2014 | Reddy et al. |
| 8,724,620 | B2 | 5/2014 | Ku et al. |
| 8,739,157 | B2 | 5/2014 | Ho et al. |
| 8,832,669 | B2 | 9/2014 | Blainey et al. |
| 8,959,484 | B2 | 2/2015 | Pinnix |
| 9,621,428 | B1 | 4/2017 | Lev et al. |
| 2005/0027870 | A1 | 2/2005 | Trebes, Jr. |
| 2005/0176428 | A1 | 8/2005 | Gabor et al. |
| 2006/0146792 | A1 | 7/2006 | Ramachandran |
| 2007/0036151 | A1 | 2/2007 | Baeder |
| 2007/0106769 | A1 | 5/2007 | Liu |
| 2008/0025221 | A1 | 1/2008 | Lipps |
| 2008/0209007 | A1 | 8/2008 | Gurecki |
| 2008/0215736 | A1 | 9/2008 | Astrom et al. |
| 2008/0254795 | A1 | 10/2008 | Ratcliffe |
| 2009/0067409 | A1 | 3/2009 | Ku et al. |
| 2009/0097398 | A1 | 4/2009 | Belinchon Vergara et al. |
| 2009/0116505 | A1 | 5/2009 | Bhatia et al. |
| 2009/0300210 | A1 | 12/2009 | Ferris |
| 2010/0136970 | A1 | 6/2010 | Mui et al. |
| 2010/0274680 | A1 | 10/2010 | Carlson |
| 2010/0296443 | A1 | 11/2010 | Hirano et al. |
| 2011/0093584 | A1 | 4/2011 | Qiu et al. |
| 2011/0117888 | A1 | 5/2011 | Klein et al. |
| 2011/0119312 | A1 | 5/2011 | Chopra et al. |
| 2011/0119729 | A1 | 5/2011 | Bergeson et al. |
| 2011/0126168 | A1 | 5/2011 | Ilyayey |
| 2011/0145836 | A1 | 6/2011 | Wheeler et al. |
| 2011/0252420 | A1 | 10/2011 | Tung et al. |
| 2011/0295996 | A1 | 12/2011 | Qiu et al. |
| 2011/0307886 | A1 | 12/2011 | Thanga |
| 2012/0011077 | A1 | 1/2012 | Bhagat |
| 2012/0030331 | A1 | 2/2012 | Karampatsis |
| 2012/0072581 | A1 | 3/2012 | Tung et al. |
| 2012/0096045 | A1 | 4/2012 | Moore et al. |
| 2012/0102183 | A1 | 4/2012 | Murakami et al. |
| 2012/0124211 | A1 | 5/2012 | Kampas et al. |
| 2012/0131591 | A1 | 5/2012 | Moorthi et al. |
| 2012/0158921 | A1 | 6/2012 | Asveren et al. |
| 2012/0203823 | A1 | 8/2012 | Manglik et al. |
| 2012/0281706 | A1 | 11/2012 | Agarwal et al. |
| 2012/0297059 | A1 | 11/2012 | Bross |
| 2012/0300615 | A1 | 11/2012 | Kempf et al. |
| 2012/0303835 | A1 | 11/2012 | Kempf et al. |
| 2012/0311154 | A1 | 12/2012 | Morgan |
| 2013/0031550 | A1 | 1/2013 | Choudhury et al. |
| 2013/0054670 | A1 | 2/2013 | Keyes |
| 2013/0088989 | A1 | 4/2013 | Noel et al. |
| 2013/0091284 | A1 | 4/2013 | Rothschild |
| 2013/0091285 | A1 | 4/2013 | Devarakonda et al. |
| 2013/0124401 | A1 | 5/2013 | Del |
| 2013/0124712 | A1 | 5/2013 | Parker |
| 2013/0132594 | A1 | 5/2013 | Boeszoermenyi et al. |
| 2013/0145367 | A1 | 6/2013 | Moss et al. |
| 2013/0182702 | A1 | 7/2013 | Ku |
| 2013/0188489 | A1 | 7/2013 | Sato |
| 2013/0227673 | A1 | 8/2013 | Yoon |
| 2013/0268913 | A1 | 10/2013 | Anderson et al. |
| 2013/0286861 | A1 | 10/2013 | Smith et al. |
| 2013/0291052 | A1 | 10/2013 | Hadar et al. |
| 2013/0303114 | A1 | 11/2013 | Ahmad et al. |
| 2013/0304904 | A1 | 11/2013 | Mouline et al. |
| 2013/0311778 | A1 | 11/2013 | Cherukuri et al. |
| 2013/0326036 | A1 | 12/2013 | Heumesser et al. |
| 2013/0344897 | A1 | 12/2013 | Pierce, II et al. |
| 2014/0010084 | A1 | 1/2014 | Kavunder et al. |
| 2014/0032850 | A1 | 1/2014 | Phelan et al. |
| 2014/0033268 | A1 | 1/2014 | Julisch et al. |
| 2014/0059226 | A1 | 2/2014 | Messerli et al. |
| 2014/0068611 | A1 | 3/2014 | McGrath et al. |
| 2014/0068703 | A1 | 3/2014 | Bzlus et al. |
| 2014/0074973 | A1 | 3/2014 | Kumar et al. |
| 2014/0082699 | A1 | 3/2014 | Eicken et al. |
| 2014/0086177 | A1 | 3/2014 | Adjakple et al. |
| 2014/0109188 | A1 | 4/2014 | Pavlov et al. |
| 2014/0112139 | A1 | 4/2014 | Allan et al. |
| 2014/0115578 | A1 | 4/2014 | Cooper et al. |
| 2014/0115583 | A1 | 4/2014 | Lee et al. |
| 2014/0123129 | A1 | 5/2014 | Risbood et al. |
| 2014/0130038 | A1 | 5/2014 | Lucovsky et al. |
| 2014/0146673 | A1 | 5/2014 | Parker |
| 2014/0149485 | A1 | 5/2014 | Sharma et al. |
| 2014/0149492 | A1 | 5/2014 | Ananthanarayanan et al. |
| 2014/0156850 | A1 | 6/2014 | Hunt |
| 2014/0189109 | A1 | 7/2014 | Jang |
| 2014/0201374 | A1 | 7/2014 | Ashwood-Smith |
| 2014/0279201 | A1 | 9/2014 | Iyoob et al. |
| 2014/0280848 | A1 | 9/2014 | Modh et al. |
| 2014/0280918 | A1 | 9/2014 | Grandhe et al. |
| 2014/0280964 | A1 | 9/2014 | Farooq et al. |
| 2014/0280966 | A1 | 9/2014 | Sapuram et al. |
| 2014/0282037 | A1 | 9/2014 | Narasimhan et al. |
| 2014/0282525 | A1 | 9/2014 | Sapuram et al. |
| 2014/0282536 | A1 | 9/2014 | Dave et al. |
| 2014/0317166 | A1 | 10/2014 | Iyoob et al. |
| 2014/0317293 | A1 | 10/2014 | Shatzkamer |
| 2015/0007169 | A1 | 1/2015 | Li et al. |
| 2015/0033365 | A1 | 1/2015 | Mellor et al. |
| 2015/0063166 | A1 | 3/2015 | Sif |
| 2015/0120890 | A1 | 4/2015 | Ghai |
| 2015/0142958 | A1 | 5/2015 | Tamura |
| 2015/0149611 | A1* | 5/2015 | Lissack ............... H04L 43/0817 709/224 |
| 2015/0180730 | A1 | 6/2015 | Feldstaine |
| 2015/0180948 | A1 | 6/2015 | Shao |
| 2015/0295750 | A1 | 10/2015 | Blanco |
| 2015/0326535 | A1 | 11/2015 | Rao et al. |
| 2015/0347264 | A1* | 12/2015 | Mohammed ........ G06F 11/3476 714/45 |
| 2015/0347759 | A1* | 12/2015 | Cabrera ................ G06F 21/577 726/25 |
| 2015/0358248 | A1 | 12/2015 | Saha et al. |
| 2015/0363423 | A1* | 12/2015 | Utgikar ............... H04L 67/1095 707/827 |
| 2015/0378703 | A1 | 12/2015 | Govindaraju et al. |

(56) References Cited

U.S. PATENT DOCUMENTS

| | | | |
|---|---|---|---|
| 2016/0013985 A1 | 1/2016 | Reddy et al. | |
| 2016/0028434 A1 | 1/2016 | Kerpez et al. | |
| 2016/0036835 A1* | 2/2016 | Lietz | H04L 63/1416 726/22 |
| 2016/0036983 A1 | 2/2016 | Korolev et al. | |
| 2016/0047566 A1 | 2/2016 | Haga et al. | |
| 2016/0080496 A1 | 3/2016 | Falanga et al. | |
| 2016/0112875 A1 | 4/2016 | Kasravi et al. | |
| 2016/0188877 A1 | 6/2016 | Simha | |
| 2016/0216994 A1 | 7/2016 | Sefidcon et al. | |
| 2016/0241446 A1* | 8/2016 | Gupte | H04L 41/5096 |
| 2017/0063598 A1 | 3/2017 | Zhu | |

OTHER PUBLICATIONS

U.S. Office Action dated Jun. 27, 2018 in U.S. Appl. No. 15/295,193.
U.S. Office Action dated Apr. 13, 2018 in U.S. Appl. No. 14/464,222.
U.S. Office Action dated Oct. 20, 2016 in U.S. Appl. No. 14/464,212.
U.S. Notice of Allowance dated Apr. 3, 2017 in U.S. Appl. No. 14/464,212.
U.S. Office Action dated Feb. 18, 2016 in U.S. Appl. No. 14/464,241.
U.S. Office Action dated Apr. 10, 2015 in U.S. Appl. No. 14/464,283.
U.S. Office Action dated Aug. 12, 2015 in U.S. Appl. No. 14/464,283.
U.S. Office Action dated Dec. 17, 2015 in U.S. Appl. No. 14/464,283.
U.S. Office Action dated Jul. 12, 2016 in U.S. Appl. No. 14/464,283.
U.S. Office Action dated Oct. 31, 2016 in U.S. Appl. No. 14/464,283.
U.S. Interview Summary dated Jun. 2, 2017 in U.S. Appl. No. 14/464,283.
U.S. Notice of Allowance dated Jun. 2, 2017 in U.S. Appl. No. 14/464,283.
U.S. Office Action dated Apr. 6, 2016 in U.S. Appl. No. 14/464,222.
U.S. Office Action dated Nov. 2, 2016 in U.S. Appl. No. 14/464,222.
U.S. Office Action dated Apr. 20, 2017 in U.S. Appl. No. 14/464,222.
U.S. Office Action dated May 18, 2016 in U.S. Appl. No. 14/464,261.
U.S. Office Action dated Jan. 12, 2017 in U.S. Appl. No. 14/464,261.
U.S. Office Action dated Oct. 20, 2016 in U.S. Appl. No. 14/464,254.
Binz, Tobias, et al. "Portable Cloud Services Using TOSCA." IEEE Internet Computing 16.3 (2012).
Somorovsky, Juraj, et al. "All your clouds are belong to us: security analysis of cloud management interfaces." Proceedings of the 3rd ACM workshop on Cloud computing security workshop. ACM, 2011.
Xu, Cheng-Zhong, Jia Rao, and Xiangping Bu. "URL: A unified reinforcement learning approach for autonomic cloud management." Journal of Parallel and Distributed Computing 72.2 (2012): 95-105.
Rochwerger, Benny, et al. "Reservoir-when one cloud is not enough." IEEE computer 44.3 (2011): 44-51.
Sotomayor, Borja, et al. "Virtual infrastructure management in private and hybrid clouds." Internet Computing, IEEE 13.5 (2009): 14-22.
Harmer, Terence, et al. "An application-centric model for cloud management." Services (Services-1), 2010 6th World Congress on. IEEE, 2010.
Stanek, Jan, Lukas Kencl, and Jiri Kuthan. "Characteristics of real open SIP-Server traffic." Passive and Active Measurement. Springer Berlin Heidelberg, 2013.
Kim, Jong Yul, and Henning Schulzrinne. "SipCloud: dynamically scalable SIP proxies in the cloud." Proceedings of the 5th International Conference on Principles, Systems and Applications of IP Telecommunications. ACM, 2011.
Scholler, Marcus, et al. "Resilient deployment of virtual network functions." Ultra Modern Telecommunications and Control Systems and Workshops (ICUMT), 2013 5th International Congress on. IEEE, 2013.
"Network Functions Virtualisation (NFV); Use Cases", ETSI, Oct. 2013.
"Virtualizing Network Services—the Telecom Cloud", Ericsson, Mar. 28, 2014.
"The Role of Layer 4-7 Services in Scaling Applications for the Cloud-Computing Data Center", Cisco, 2011.
Kächele, Steffen, et al. "Beyond IaaS and PaaS: An extended cloud taxonomy for computation, storage and networking." Proceedings of the 2013 IEEE/ACM 6th International Conference on Utility and Cloud Computing. IEEE Computer Society, 2013.
Ravindran, Ravishankar, et al. "Towards software defined ICN based edge-cloud services." Cloud Networking (CloudNet), 2013 IEEE 2nd International Conference on. IEEE, 2013.
"Software Defined Network and Network Functions Virtualization", Vikram Nair, 2014.
Manzalini, Antonio, and Roberto Saracco. "Software Networks at the Edge: A Shift of Paradigm." Future Networks and Services (SDN4FNS), IEEE, 2013.
Manzalini, Antonio, et al. "Clouds of virtual machines in edge networks." Communications Magazine, IEEE 51.7 (2013).
"The Real-Time Cloud", Ericsson, Feb. 2014.
Basilier et al., "Virtualizing network services-the telecom cloud," Ericsson Review, Mar. 28, 2014, Ericsson.
White paper from ONUG Board of Directors, "Open Networking Challenges and Opportunities," Jul. 2014.
U.S. Office Action dated Feb. 16, 2018 in U.S. Appl. No. 14/464,261.
U.S. Office Action dated Nov. 27, 2018 in U.S. Appl. No. 15/295,193.

* cited by examiner

LOAD ADAPTATION ARCHITECTURE FRAMEWORK FOR ORCHESTRATING AND MANAGING SERVICES IN A CLOUD COMPUTING SYSTEM

CROSS-REFERENCE TO RELATED APPLICATIONS

This application is a continuation of and claims priority to U.S. patent application Ser. No. 14/464,212, entitled "Load Adaptation Architecture Framework for Orchestrating and Managing Services in a Cloud Computing System," filed Aug. 20, 2014, now U.S. Pat. No. 9,742,690, which is incorporated herein by reference in its entirety.

BACKGROUND

Cloud systems can manage workloads by monitoring physical server and virtual machine utilization, including, for example, processor utilization, memory utilization, and storage utilization. If servers in a virtual machine cluster have low utilization, a cloud orchestration and management system might re-balance workloads by moving applications from a cluster with high utilization. Likewise, if servers in a virtual machine cluster have high utilization, the cloud orchestration and management system might re-balance workloads by moving the applications to a cluster with low utilization. The cloud orchestration and management system may add under-utilized clusters to highly utilized clusters in order to increase available capacity. Current cloud orchestration and management systems, however, cannot manage workloads for some types of services, including, for example, services that are delivered in real-time or near real-time.

SUMMARY

Concepts and technologies disclosed herein are directed to a load adaptation architecture framework for orchestrating and managing services in a cloud computing system. The services can include, but are not limited to, Open Systems Interconnection ("OSI") communication model layers 4-7 services, real-time services such as voice and video services, and other real-time or near real-time telecommunications services. It should be understood that the concepts and technologies disclosed herein can be applied to any type of service, and as such, the use of specific service types, such as telecommunications services, should not be construed as being limiting in any way.

Real-time services are stateful and have stringent requirements for moving workloads. Traffic load for some real-time services (e.g., mass calling events, such as a voting event for an episode of a singing competition) is based on business rules, such as the time of day, and as such can be predicted ahead of time. Other policies exist for real-time services in addition to predicted schedules where inferences can be made about available capacity based upon a request queue length or number of active calls. Such policies may be independent of processor utilization, but can provide predictive data. The current mechanism of rebalancing workloads, which is typically based only on servers and/or virtual machine utilization, cannot be readily applied to workloads for services that are delivered by layers 4-7 in a cloud computing system. Additionally, in real-time applications, once capacity is exhausted it may be too late to respond because lost events cannot be recovered and handled later. Therefore, predictive orchestration functions are needed to avoid a catastrophic failure of a system due to sudden traffic surges. These problems can be solved by applying some of the concepts and technologies disclosed herein that utilize predictive traffic forecasting techniques to detect the need for scale-in or scale-out ahead of time and dynamically allocate resources in the cloud based on the traffic forecast.

According to one aspect of the concepts and technologies disclosed herein, a cloud computing system can include a load adaptation architecture framework that performs operations for orchestrating and managing one or more real-time or near real-time services that operate, for example, within at least one of layers 4 through 7 of the OSI communication model. The cloud computing system also can include a virtual resource layer. The virtual resource layer can include a virtual network function that provides, at least in part, a service that operates within at least one of layers 4 through 7 of the OSI communication model. The cloud computing system also can include a hardware resource layer. The hardware resource layer can include a hardware resource that is controlled by a virtualization layer. The virtualization layer can cause the virtual network function to be instantiated on the hardware resource so that the virtual network function can be used to support the service.

In some embodiments, the load adaptation architecture framework can include a demand monitoring component. The demand monitoring component can monitor connection to the service within one or more monitored regions and can detect whether the connections to the service at least meet a threshold. The demand monitoring component also can send a number representative of the connections to a service management decision engine ("SMDE") of the load adaptation architecture framework. The SMDE can determine that a new virtual network function should be instantiated to handle a load created by the connections since the existing virtual network function is unable to handle the load. The SMDE also can trigger a service orchestrator of the load adaptation framework to add the new virtual network function in the monitored region to handle the load.

In some embodiments, the service orchestrator can retrieve a template from a template repository. The template can specify one or more attributes for the new virtual network function. The service orchestrator also can request a resource orchestrator to instantiate the new virtual network function in accordance with the template. The service orchestrator can cause the virtualization layer to instantiate the new virtual network function in accordance with the template. The service orchestrator also can configure the new virtual network function to provide, at least in part, the service.

The template can include a compute profile, a network profile, and a policy definition. The compute profile can include an affinity rule, an anti-affinity rule, an availability region attribute, a cluster category attribute, a security zone attribute, a service priority attribute, or any combination thereof. The network profile can include a traffic priority attribute and/or a network performance category attribute. The policy definition can include a policy owner attribute, a policy type attribute, a technology type attribute, or any combination thereof.

According to another aspect of the concepts and technologies disclosed herein, an SMDE can include a traffic forecasting component that, when executed by a hardware resource, performs operations. The operations can include collecting data associated with a load experienced by a virtualized resource that provides, at least in part, a real-time or near real-time service that operates, for example, within one of layer 4 through layer 7 of the OSI communication model. The operations also can include determining how to scale a virtualized resource pool that comprises the virtualized resource based, at least in part, upon a policy and the load. The operations also can include instructing an elasticity management component to scale the virtualized resource pool in accordance with a scaling decision regarding how to scale the virtualized resource pool. The SMDE also can include an elasticity management component that, when executed by the hardware resource, performs operations. The operations can include coordinating with a service orchestrator to scale the virtualized resource pool to accommodate the load in accordance with the policy. In some embodiments, the SMDE can collect the data from a monitoring component that monitors utilization of the virtualized resource pool.

In some embodiments, the policy can include a threshold number of incoming connections to the service. As referred to herein, a "connection" refers to an attachment to a service. In these embodiments, making the scaling decision based upon the policy and the load can include determining whether a number of incoming connections at least meets the threshold number of incoming connections. The scaling decision can be further based upon a business rule.

According to another aspect of the concepts and technologies disclosed herein, a method can include detecting, via a demand monitoring component of a load adaptation architecture framework, in a monitored region that connections to a service at least meet a threshold. The method also can include sending, via the demand monitoring component, a number representative of the subscriber connections to a service management decision engine of the load adaptation architecture framework. The method also can include determining, via the service management decision engine, that a new virtual network function should be instantiated to handle a load created by the connections. The method also can include triggering, via the service management decision engine, a service orchestrator of the load adaptation architecture framework to add the new virtual network function in the monitored region to handle the load.

In some embodiments, the method also can include retrieving, by the service orchestrator, a template for the new virtual network function from a template repository. The method also can include requesting, by the service orchestrator, action by a resource orchestrator to instantiate the new virtual network resources in accordance with the template.

In some embodiments, the method also can include causing, by the resource orchestrator, the virtualization layer to instantiate the new virtual network function in accordance with the template. The method also can include configuring, by the service orchestrator, the new virtual network function to provide the service.

In some embodiments, the method also can include managing, by a license management function, allocation and release of a software license for software utilized, at least in part, by the new virtual network function.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
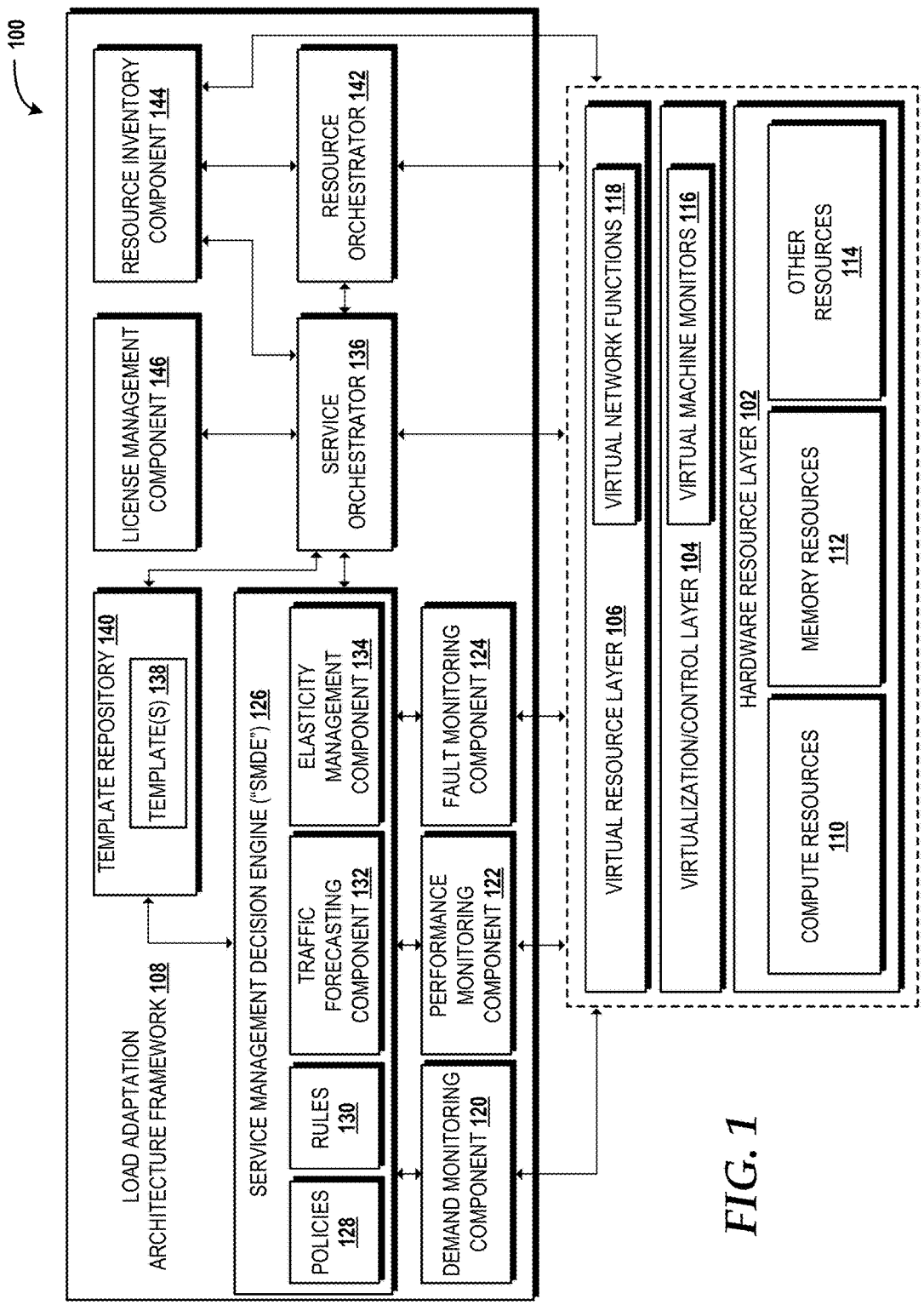
FIG. 1 is a block diagram illustrating aspects of an illustrative cloud computing system for implementing the various concepts and technologies disclosed herein.

Concepts and technologies disclosed herein are directed to a load adaptation architecture framework for orchestrating and managing services in a cloud computing system. The services can include, but are not limited to, Open Systems Interconnection ("OSI") communication model layers 4-7 services, real-time services such as voice and video services, and other real-time or near real-time telecommunications services. It should be understood that the concepts and technologies disclosed herein can be applied to any type of service, and as such, the use of specific service types, such as telecommunications services, should not be construed as being limiting in any way.

Cloud orchestration and management can support a load adaptation framework that provides advanced cloud elasticity. Advanced cloud elasticity can provide the ability to grow cloud resources dynamically based upon demand. The load adaptation framework can include a service management and decision engine ("SMDE") which supports intelligent resource and service monitoring and management capabilities. The SMDE can provide, via a traffic forecasting function, traffic forecasts based upon demand data, performance data, fault data, or a combination thereof. Demand data can include user population data that is based upon measurements, trends, and/or expectations. Performance data can be based upon average and/or worst-case throughput of transactions. Fault data can include hardware failures, connection failures, and/or other failures that impact performance expectations.

The SMDE may also use pre-provisioned business rules (e.g., AMERICAN IDOL event day of week and time of day rules) to make decisions. Additionally, the SMDE can use information from demand and performance monitoring functions to perform predictive traffic forecasting and uses automated proactive and reactive mechanisms for load adaptation to handle changes in load. An elasticity management function of the SMDE triggers the dynamic allocation of appropriate resources in the cloud based on the traffic predictions. The SMDE can be automated for most situations and can also have manual controls for operations to exercise under certain emergency situations as required.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Referring now to FIG. 1, aspects of a cloud computing system 100 for implementing various embodiments of the concepts and technologies disclosed herein will be described. The illustrated cloud computing system 100 includes a hardware resource layer 102, a virtualization/control layer 104, a virtual resource layer 106, and a load adaptation architecture framework 108 that work together to perform resource monitoring and management operations, service monitoring and management operations, resource orchestration operations, service orchestration operations, license management operations, and task automation operations as will be described in detail herein. While connections are shown between some of the components illustrated in FIG. 1, it should be understood that some, none, or all of the components illustrated in FIG. 1 can be configured to interact with one other to carry out various functions described herein. In some embodiments, the components are arranged so as to communicate via one or more networks (best shown in FIG. 6). Thus, it should be understood that FIG. 1 and the following description are intended to provide a general understanding of a suitable environment in which various aspects of embodiments can be implemented, and should not be construed as being limiting in any way.

The hardware resource layer 102 provides hardware resources, which, in the illustrated embodiment, include one or more compute resources 110, one or more memory resources 112, and one or more other resources 114. The compute resource(s) 110 can include one or more hardware components that perform computations to process data, and/or to execute computer-executable instructions of one or more application programs, operating systems, and/or other software. The compute resources 110 can include one or more central processing units ("CPUs") configured with one or more processing cores. The compute resources 110 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 110 can include one or more discrete GPUs. In some other embodiments, the compute resources 110 can include CPU and GPU components that are configured in accordance with a co-processing CPU/GPU computing model, wherein the sequential part of an application executes on the CPU and the computationally-intensive part is accelerated by the GPU. The compute resources 110 can include one or more system-on-chip ("SoC") components along with one or more other components, including, for example, one or more of the memory resources 112, and/or one or more of the other resources 114. In some embodiments, the compute resources 110 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 110 can be or can include one or more hardware components architected in accordance with an ARM architecture, available for license from ARM HOLDINGS of Cambridge, United Kingdom. Alternatively, the compute resources 110 can be or can include one or more hardware components architected in accordance with an x86 architecture, such an architecture available from INTEL CORPORATION of Mountain View, Calif., and others. Those skilled in the art will appreciate the implementation of the compute resources 110 can utilize various computation architectures, and as such, the compute resources 110 should not be construed as being limited to any particular computation architecture or combination of computation architectures, including those explicitly disclosed herein.

The memory resource(s) 112 can include one or more hardware components that perform storage operations, including temporary or permanent storage operations. In some embodiments, the memory resource(s) 112 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 110.

The other resource(s) 114 can include any other hardware resources that can be utilized by the compute resources(s) 110 and/or the memory resource(s) 112 to perform operations described herein. The other resource(s) 114 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 102 can be virtualized by one or more virtual machine monitors ("VMMs") 116 (also known as "hypervisors") operating within the virtualization/control layer 104 to create one or more virtual resources that reside in the virtual resource layer 106. The VMMs 116 can be or can include software, firmware, and/or hardware that alone or in combination with other software, firmware, and/or hardware, creates one or more virtual resources operating within the virtual resource layer 106.

The virtual resources operating within the virtual resource layer 106 can include abstractions of at least a portion of the compute resources 110, the memory resources 112, and/or the other resources 114, or any combination thereof. In the illustrated embodiment, the virtual resource layer 106 includes one or more special-purpose virtual machines referred to herein as virtual network functions ("VNFs") 118. The VNF(s) 118 can be virtualizations of any network functions that perform, at least in part, one or more operations to support one or more services, such as OSI layer 4-7 services.

Layer 4 of the OSI communication model, also known as the Transport Layer, ensures end-to-end delivery of messages for both "connection-mode" data such as transfer control protocol ("TCP") connections and "connectionless-mode" data such as user datagram protocol ("UDP") datagrams. For both modes, the endpoints of communication are identified by port numbers such as TCP port 80 or UDP port 161.

Layer 5 of the OSI communication model, also known as the Session Layer, provides services for coordinating communication between applications and synchronizing message delivery. For example, a protocol with suspend and resume or checkpoint and rollback capabilities includes session layer services such as, but not limited to, session initiation protocol ("SIP"), APPLETALK available from APPLE INC., and remote procedure call ("RPC").

Layer 6 of the OSI communication model, also known as the Presentation Layer, provides services for converting data from local format (i.e., abstract syntax) into a machine-independent format (i.e., transfer syntax). Some example layer 6 protocols include, but are not limited to, transport layer security ("TLS") and secure sockets layer ("SSL") protocols. Some layer 6 protocols are defined in Abstract Syntax Notation One ("ASN.1") notation. ASN.1 defines a set of data structures mapped to encoding rules—for example, how an Integer should be encoded into a bit string to be transmitted to and decoded by a recipient using XML Encoding Rules (XER).

Layer 7 of the OSI communication model, also known as the Application Layer, provides common services used by applications to establish, release, and abort communication with each other, as well as specific services. Most applications function within layer 7.

The virtual resources residing in the virtual resource layer 106 can be useable by the load adaptation architecture framework 108 to manage and orchestrate one or more services. The VNF(s) 118 can be utilized by the load adaptation architecture framework 108 to enable dynamic workload management for one or more services, including real-time services such as, but not limited to, voice calling, video calling, and other time-sensitive telecommunications services. Moreover, the load adaptation architecture framework 108 facilitates an elastic service model that can dynamically allocate the VNFs 118 and can instruct the virtualization/control layer 104 to create one or more additional VNFs to handle service demand fluctuations as well as to accommodate and, in some instances, to accelerate market growth with minimal, if any, downtime.

The load adaptation architecture framework 108 includes a demand monitoring component 120, a performance monitoring component 122, and a fault monitoring component 124 (referred to herein collectively as "monitoring components 120-124"). The monitoring components 120-124 can provide data to a service management decision engine ("SMDE") 126. The SMDE 126 can utilize the data to make decisions regarding network traffic forecasting.

The demand monitoring component 120 can monitor demand for resources. Demand data can include, for example, user population data that is based upon measurements, trends, and/or expectations. The user population data can be determined, for example, based upon a number of concurrent service sessions, a number of active subscribers to a service, and/or any other data regarding the utilization of one or more resources, such as one or more of the VNFs 118, that provide, at least in part, a monitored service.

The performance monitoring component 122 can monitor performance of current resources. Performance data can provide insight into the ability of the current resources to support the existing load, including available idle capacity, throughput, and the like. The performance data can be based upon average and/or worst-case throughput of transactions.

The fault monitoring component 124 can monitor the hardware resources operating within the hardware resource layer 102. Fault data can include hardware failures, connection failures, and/or other failures of the hardware resources.

The monitoring components 120-124 can receive alerts from the virtual resource layer 106 and can make queries to the virtual resource layer 106 via simple network management protocol ("SNMP") or other suitable protocol. The monitoring components 120-124 can query specific resources, such as one or more of the VNFs 118, and can receive, in response, data specific to the configuration of the queried resources. The data can be utilized to monitor, to track, and to trend the hardware resources utilized by the queried resource. The VMMs 116 can perform operations to provide capacity and utilization data in real-time for the hardware resources associated with the virtual resources operating within the virtual resource layer 106. The performance monitoring component 122 can monitor virtual resource performance at the service layer and can be based on the virtual resource container(s) in which a given service is running. The monitoring frequency can be configurable and can be tuned to meet performance constraints of network functions (e.g., monitoring too often may impact the performance of the network function) and timeframes appropriate for dynamic orchestration.

The SMDE 126 can provide intelligent virtual resource and service monitoring. The SMDE 126 also can provide management functions for the load adaptation architecture framework 108. The SMDE 126 can include one or more policies 128, one or more rules 130, a traffic forecasting component 132, and an elasticity component 134. The traffic forecasting component 132 can make scale-in and scale-out decisions based upon one or more of the policies 128 and/or one or more of the rules 130 that apply to data received from the monitoring components 120-124. For example, the demand monitoring component 120 can provide a rate of incoming subscriber connections to a monitored service, and the policies 128 can include a policy that defines a threshold rate of incoming subscriber connections that can be utilized by the traffic forecasting component 132 to determine whether scale-in operations or scale-out operations should be performed. As used herein, a "scale-in" operation can include reducing or shrinking the number or capacity of the resources. As used herein, a "scale-out" operation can include increasing the number or capacity of the resources.

The traffic forecasting component 132 can additionally or alternatively utilize one or more of the rules 130 for decisions regarding scale-in and scale-out. The rules 130 can include business rules. A business rule, for example, can include a time of day for a pre-determined event such as a mass calling voting event for an episode of a singing competition. Other business rules in addition to predicted schedule-based rules where inferences can be made about available capacity based upon a request queue length or number of active calls are contemplated. Such business rules are independent of processor utilization, but can provide predictive data for use by the traffic forecasting component 132.

The SMDE 126 can use data received from the demand monitoring component 120 and the performance monitoring component 122 to perform predictive traffic forecasting via the traffic forecasting component 132. The SMDE 126 can use automated proactive and reactive mechanisms to perform load adaptation operations for handling load changes experienced by virtual resources operating within the virtual resource layer 106. The elasticity management component 134 can trigger dynamic allocation of virtual resources based on the traffic predictions provided by the traffic forecasting component 132. The SMDE 126 can provide manual controls to be used by personnel under emergency situations.

The SMDE 126 can communicate with a service orchestrator 136. The service orchestrator 136 can orchestrate real-time allocation of virtual resources to a service. The virtual resources can be provided by the virtual resource layer 106 using one or more cloud service application programming interfaces ("APIs") (not shown). The service orchestrator 136 can orchestrate the composition of services to create and execute composite services. The service orchestrator 136 can maintain service topology information as well as workflows that guide the orchestration of services.

The service orchestrator 136 can retrieve a template 138 from a template repository 140. The template 138 can define quality of service ("QoS") constraints. The template 138 can define service-level agreement ("SLA") constraints. The template 138 can define resource requirements of the service. The template 138 can specify how resources for a service should be instantiated. For example, the template 138 can provide redundancy rules, host/core affinity and anti-affinity rules, availability region, QoS requirements, software-defined networking requirements, and scaling dependencies (e.g., if application grows by x, database needs to grow by y). The template 138 can specify orchestration dependencies. For example, the template 138 can specify what should happen when a service is dynamically instantiated (e.g., dynamic binding to downstream components, add components that are part of the service to a load-balancer, open firewalls, enable traffic flows, and enable communication with other network functions.) An illustrative example of the template 138 will be described herein below with reference to FIG. 2.

The service orchestrator 136 can trigger a resource orchestrator 142 to cause the resource orchestrator 142 to request instantiation of one or more new virtual resources in the virtual resource layer 106. After the new virtual resource(s) has been instantiated, the service orchestrator 136 can manage real-time provisioning of the service on the virtual resource(s). Configuration parameters for the service can be specific to a location or other attributes (e.g., throttling parameters and timers). The resource orchestrator 142 can orchestrate real-time allocation of available virtual resources for a service based on service parameters.

The resource orchestrator 142 can communicate with a resource inventory component 144. The resource inventory component 144 can maintain the status of overall available virtual resources. The resource inventory component 144 can update the inventory based on real-time reporting from the cloud infrastructure. The resource orchestrator 142 can communicate with the resource inventory component 144 to determine the virtual resources available from the virtual resource layer 106 and can use this information in a decision regarding whether or not to request instantiation of one or more new virtual resources from the virtual resource layer 106.

The load adaptation architecture framework 108 also includes a license management component 146. The license management component 146 can adapt to elasticity by managing the allocation and release of software licenses for software instances dynamically in real-time.

Figure 2:
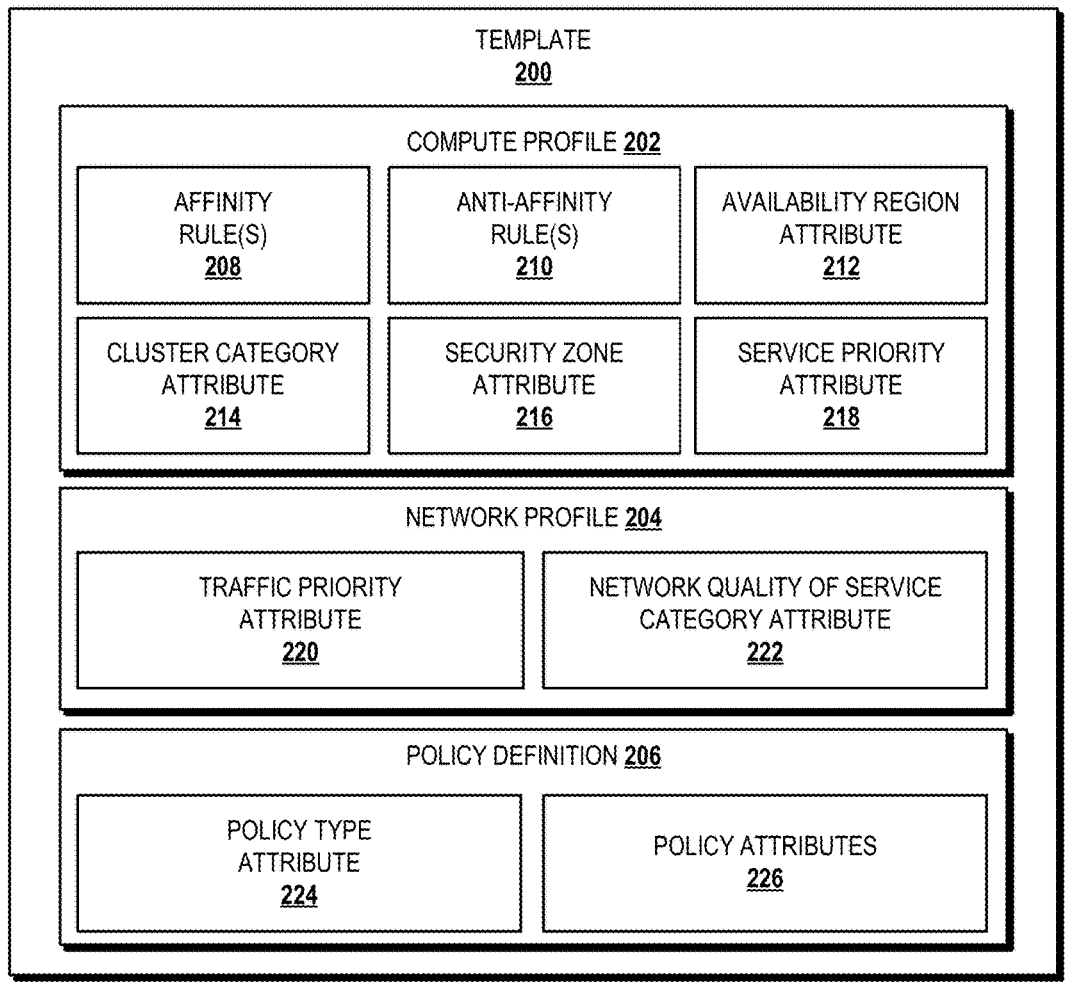
FIG. 2 is a block diagram illustrating aspects of a template, according to an illustrative embodiment.

Turning now to FIG. 2, a block diagram illustrating aspects of an illustrative template 200 will be described. The template 138 described above in FIG. 1, in some embodiments, can include at least a portion of the attributes of the template 200. The illustrated template 200 includes a compute profile 202, a network profile 204, and a policy definition 206.

The compute profile 202 can include one or more affinity rules 208 and one or more anti-affinity rules 210. The affinity rule(s) 208 and the anti-affinity rule(s) 210 are used to determine whether VNFs, such as the VNFs 118, should be kept together or separated, respectively. The affinity rule(s) 208 can help reduce network bandwidth and latency between VNFs and may be applied to clusters and/or hosts, or may be used to specify co-location with other VNFs at the same data center. The anti-affinity rule(s) 210 can prevent VNFs from sharing a host and may be used to specify resiliency requirements to ensure that redundant VNFs are deployed on separate physical hosts. The anti-affinity rule(s) 210 can be used so that the entire pool of VNFs does not fail if a physical host fails.

The compute profile 202 also can include an availability region attribute 212. The availability region attribute 212 can specify the location where a VNF should be instantiated. The availability region attribute 212 can specify a general region, such as, for example, a northeast or southeast region. The availability region attribute 212 can additionally or alternatively specify one or more data centers in which the VNF should be instantiated. Each data center may include a portion of the hardware resources in the hardware resource layer 102 (best shown in FIG. 1).

The compute profile 202 also can include a cluster category attribute 214. The cluster category attribute 214 can determine performance characteristics of a virtual machine cluster that will be used when orchestrating a service, including, for example, virtual resources that support a response time that is real-time, web-time, near-real-time, or non-real-time. Real-time can be measured in milliseconds/microseconds and is the responsiveness used to support the low timing threshold for SIP queries and responses. Web-time can be measured in hundreds of milliseconds. Near-real time is measured in seconds. Non-real time is a response measured in minutes, hours, or days.

The compute profile 202 also can include a security zone attribute 216. The security zone attribute 216 can specify a security zone in which a virtual machine should be instantiated. Examples of security zones can include untrusted zones, trusted but vulnerable zones (demilitarized zone), and trusted zones.

The compute profile 202 also can include a service priority attribute 218. The service priority attribute 218 can specify a service priority given to a service by a cloud infrastructure. A service priority may be categorized in several ways. Examples of service priority categories include, but are not limited to, bronze/silver/gold/platinum, low/medium/high/highest, or 1/2/3/4/5 (e.g., where services with service priority 1 get the highest priority). Using the service priority attribute 218, network functions may, for example, run with gold priority, application servers such as NS/EP (for government national security emergency preparedness) may run with platinum priority, other real-time services may run with silver priority, services for paying customers that want a higher priority may run with gold priority, and services for customers that do not require a higher priority may run with bronze priority.

The network profile 204 can include a traffic priority attribute 220. The traffic priority attribute 220 can specify a priority given to network traffic for a service. Example traffic priorities include, but are not limited to, real-time conversational voice, video, and Government Emergency Telecommunications Services ("GETS").

The network profile 204 also can include a network QoS category attribute 222. The network QoS category attribute 222 can specify network bandwidth parameters that should be used for a service. The network bandwidth may specify a minimum guaranteed bandwidth for a service. In some implementations, the network bandwidth parameters may be categorized as high, medium, or low priority cloud network traffic with an associated network bandwidth allocation with the following example. It should be understood that the network bandwidth parameters shown in the following example should not be construed as being limiting in any way.

A content distribution service may be allowed to request an increase in bandwidth, when necessary, in order to deliver content to file servers in a network. Popular content may be associated with new music or new video content becoming available. During this period, the content distribution service may request additional bandwidth to ensure that the new content is staged in the proper regions for further distribution. The network can set a limit to the amount of bandwidth requested by the content distribution service and can also associate this request for extra bandwidth with a routing priority. The content distribution service may be able to request 75 Mbps at normal priority or may be able to request up to 500 Mbps at low priority, for example. Low priority traffic can be routed only when no higher priority packets are waiting to be delivered. Thus, the content may be delivered more quickly at low priority during times when the network is not heavily occupied, but during busy conditions it may be better to request less bandwidth at higher priority to ensure that other traffic does not interfere with the guaranteed transfer rate.

The policy definition 206 can include a policy type attribute 224 and one or more policy attributes 226. The policy type attribute 224 can specify a type of policy, which may be a correlation policy, an event generation policy, or an operational policy. The policy attributes 226 can define one or more rules that should be applied under specific conditions.

The policy attributes 226, in some embodiments, can be described using eXtensible Access Control Markup Language ("XACML"). XACML is a request/response language that lets systems access resources by forming a query to ask whether or not a given action should be allowed, and interpreting the result. The response can include an answer about whether the request should be allowed using one of four values: Permit, Deny, Indeterminate (an error occurred) or Not Applicable (the request can't be answered by this service). At the root of XACML decisions is a policy or a policy set. A policy set is a container that can hold other policies or policy sets, as well as references to policies found in remote locations. A policy represents a single access control policy, expressed through a set of rules. Once a policy is found, and verified as applicable to a request, the rules associated with that policy are evaluated and the conditions are deemed true or false by a comparison to attributes of the request. Requests are evaluated by a XACML decision function—a general implementation of logic that operates on the XACML policy definition associated with a resource. Once presented with a request, the decision function evaluates the policy and returns a response. The response includes a decision, a Status (explaining the Decision), and an optional set of obligations. The obligations tell a policy enforcement point what the policy enforcement point is to do before granting the request.

Figure 3:
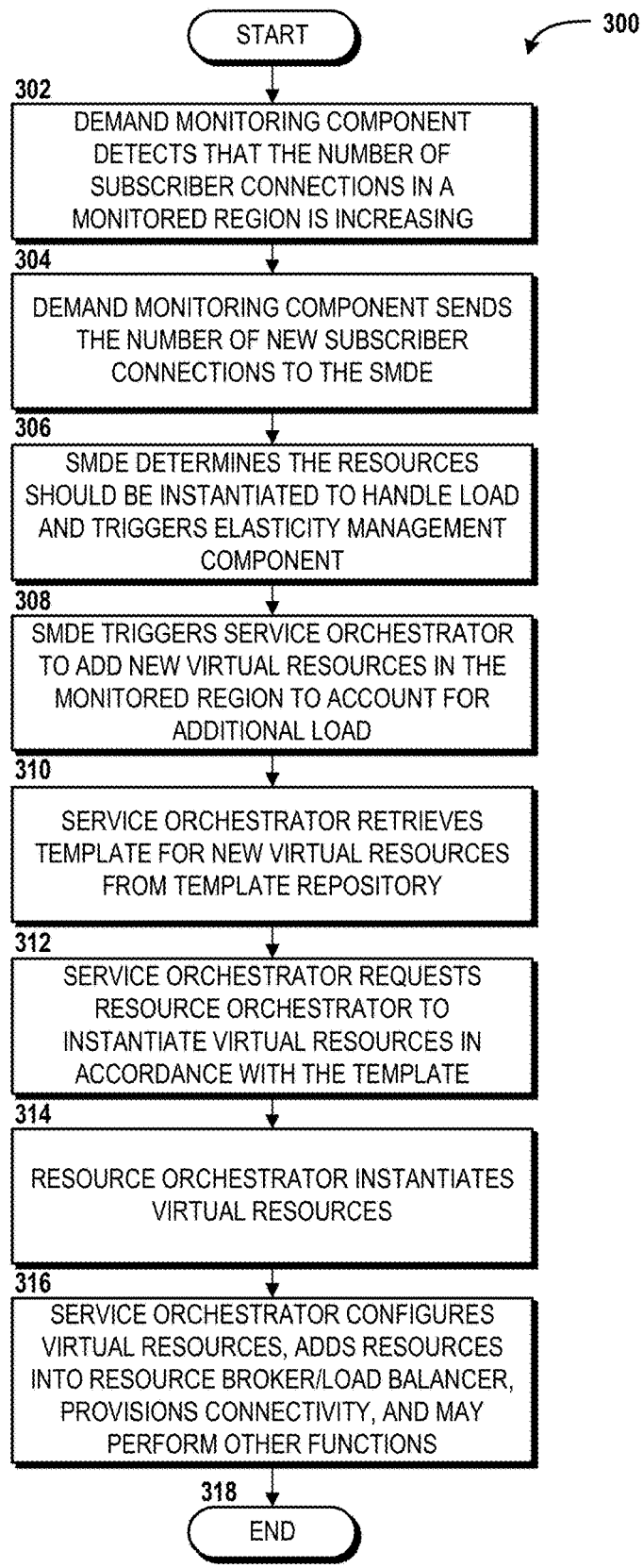
FIG. 3 is a flow diagram illustrating aspects of a method for orchestrating and managing services in a cloud computing system, according to an illustrative embodiment.

Turning now to FIG. 3, aspects of a method 300 for orchestrating and managing services in a cloud computing system will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor, such as, for example, one of the compute resources 110 of the hardware resource layer 102, a processor of the SMDE 126, a processor of the service orchestrator 136, a processor of the resource orchestrator 142, and/or a processor one or more other computing systems, devices, engines, or components disclosed herein to perform operations. It should be understood that the performance of one or more operations may include operations executed by one or more virtual processors at the instructions of one or more of the aforementioned hardware processors.

The method 300 will be described with reference to FIG. 3 and further reference to FIG. 1. The method 300 begins at operation 302, where the demand monitoring component 120 detects that the number of subscriber connections in a monitored region is increasing. The demand monitoring component 120 may detect that the number of subscriber connections in the monitored region is increasing based upon the number of subscriber connections approaching a peak threshold that is indicative of a peak number of subscriber connections for the monitored region.

From operation 302, the method 300 proceeds to operation 304, where the demand monitoring component 120 sends the number of new subscriber connections to the SMDE 126. The SMDE 126 receives the number of new subscriber connections from the demand monitoring component 120 and determines, at operation 306, the virtual resources that should be instantiated to handle the additional load created by the number of new subscriber connections. At operation 306, the SMDE 126 also triggers the elasticity management component 134 to coordinate with the service orchestrator 136, at operation 308, to instantiate the virtual resources that are to be used to handle the additional load created by the number of new subscriber connections.

From operation 308, the method 300 proceeds to operation 310, where the service orchestrator 136 retrieves a template, such as one of the template 138, from the template repository 140. From operation 310, the method 300 proceeds to operation 312, where the service orchestrator 136 requests the resource orchestrator 142 to instantiate virtual resources in the virtual resource layer 106 in accordance with the template retrieved at operation 310.

From operation 312, the method 300 proceeds to operation 314, where the resource orchestrator 142 requests instantiation of the virtual resources from the virtual resource layer 106 in accordance with the template 138. From operation 314, the method 300 proceeds to operation 316, where the service orchestrator 136 configures the virtual resources, adds resources into resource broker/load balancer, provisions connectivity, and may perform other functions to orchestrate the service in support of the additional load.

For example, the service may be a SIP session proxy. As demand increases, the system can use additional session capacity. Each session can use resources for origination and termination. These resources may include additional telephony servers that take a session request and resolve the session request into an IP address for terminating the session. Each server resource can handle a maximum number of new sessions. Session state can be stored in a persistent data record so storage resources can be allocated proportional to the number of connected users. Media should be terminated for each active session. Various users of the example SIP proxy service may require zero sessions, one session, or multiple sessions at a time. Media server resources can be allocated for each active session. A session-based service such as the example SIP proxy service can have a template that defines which of these resources should be allocated in what proportion to the number of connections to be handled. The service orchestrator 136 can send these requests out to the one or more orchestrators responsible for each of the resource requests. The service orchestrator 136 can mandate that all requests be satisfied. Then the service orchestrator 136 can set a new threshold for additional connections to insure that the system may grow again when necessary and a new threshold for shrinking the service can be set as well.

From operation 316, the method 300 proceeds to operation 318. The method 300 ends at operation 318.

Figure 4:
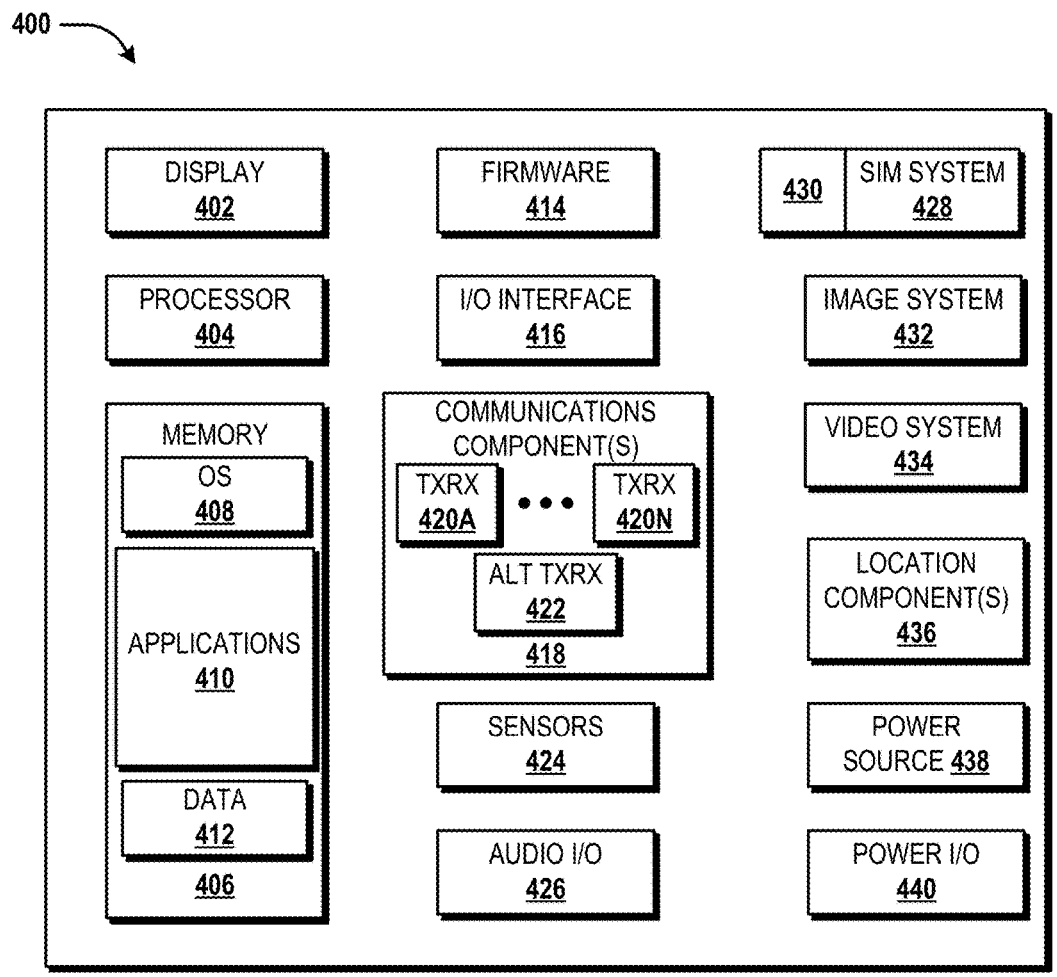
FIG. 4 is a block diagram illustrating an example mobile device capable of implementing aspects of the embodiments disclosed herein.

Turning now to FIG. 4, an illustrative mobile device 400 and components thereof will be described. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UI") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, one or more identifiers, and/or other applications or program modules. According to various embodiments, the data 412 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1344 ("FIREWIRE") port, a serial port, a parallel port, an Ethernet (RJ45) port, an RJ10 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
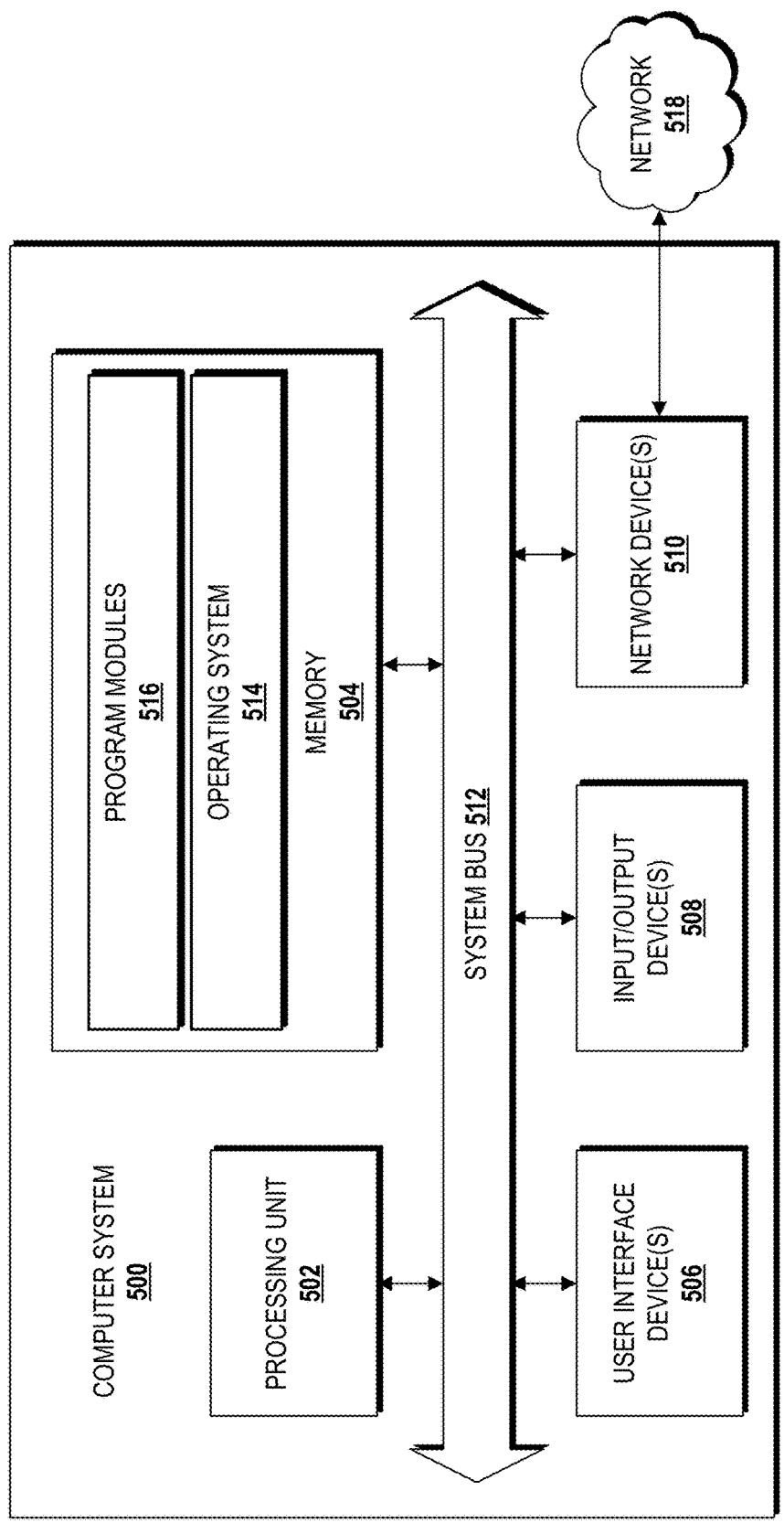
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the hardware resource layer 102 (illustrated in FIG. 1) includes one or more computers that are configured like the architecture of the computer system 500. The computer system 500 may provide at least a portion of the compute resources 110, the memory resources 112, and/or the other resources 114. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 110 (illustrated in FIG. 1) can include one or more processing units 502.

The memory 504 communicates with the processing unit 502 via the system bus 512. In some embodiments, the memory 504 is operatively connected to a memory controller (not shown) that enables communication with the processing unit 502 via the system bus 512. The memory resources 114 can include one or more instances of the memory 504. The illustrated memory 504 contains an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof. Although not shown in FIG. 5, it should be understood that the memory 504 also can be configured to store the template repository 140.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
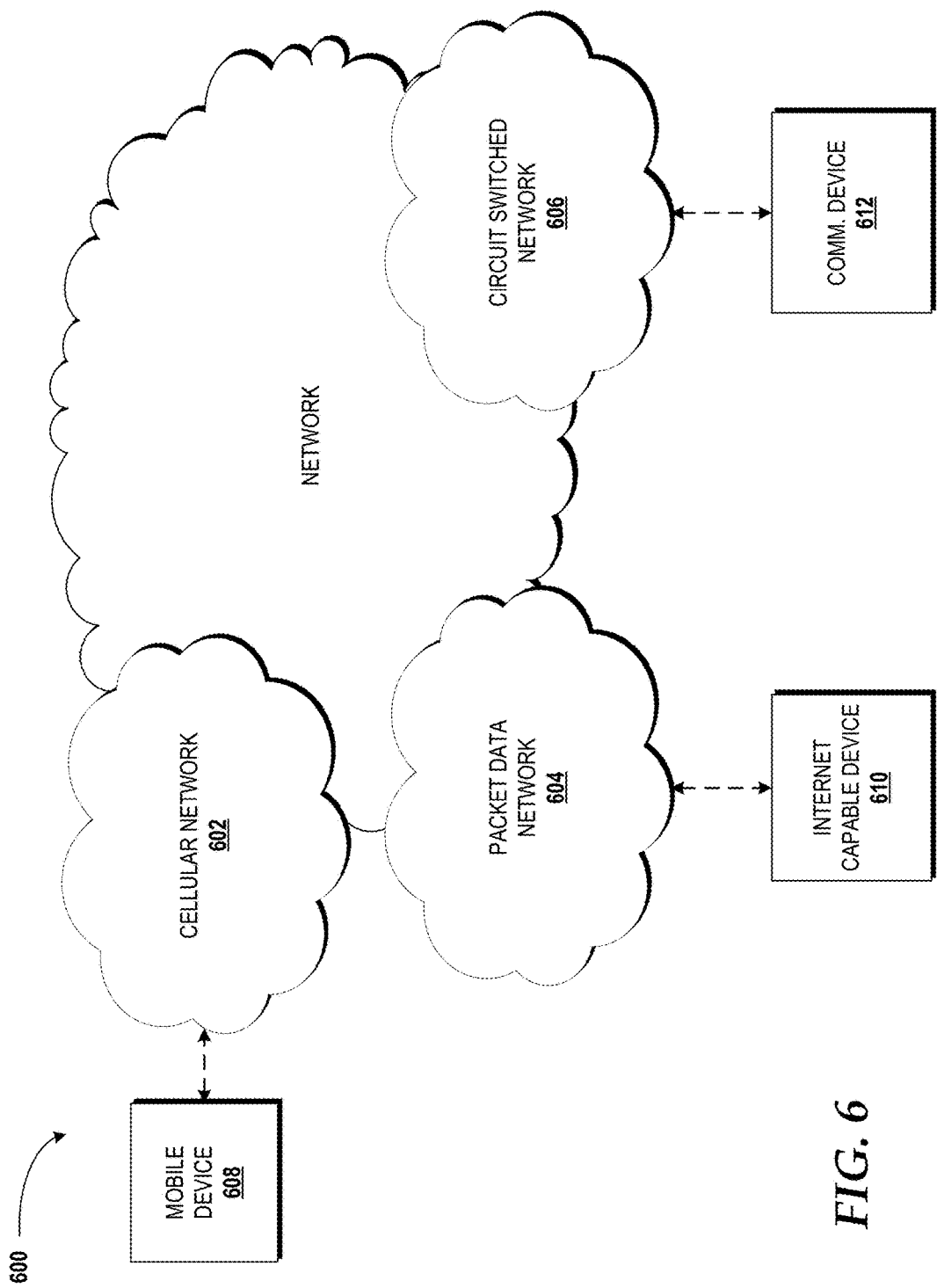
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, for example, the Internet, and a circuit switched network 606, for example, a PSTN. The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, video data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, routers, packet gateways, and other devices in communication with one another, as is generally known. The packet data network 604 can be or can include the cloud computing system 100 illustrated and described with reference to FIG. 1. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a POTS. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies directed to a load adaptation architecture framework for orchestrating and managing services in a cloud computing system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer-readable storage medium comprising computer-executable instructions that, when executed by a cloud computing system, cause the cloud computing system to perform operations comprising:
   detecting, in a monitored region comprising a virtual network function, that connections to a service at least meet a threshold;
   in response to detecting that the connections to the service at least meet the threshold, determining that a new virtual network function should be instantiated to handle a load created by the connections, wherein the virtual network function is unable to handle the load; and
   instantiating the new virtual network function in the monitored region to handle the load.

2. The computer-readable storage medium of claim 1, wherein the operations further comprise retrieving a template that specifies attributes for the new virtual network function; and wherein instantiating the new virtual network function in the monitored region to handle the load comprises instantiating the new virtual network function in accordance with the template.

3. The computer-readable storage medium of claim 2, wherein the operations further comprise configuring the new virtual network function to provide, at least in part, the service.

4. The computer-readable storage medium of claim 1, wherein the operations further comprise predicting a demand for the virtual network function.

5. The computer-readable storage medium of claim 4, wherein the operations further comprise receiving usage data; and wherein predicting the demand for the virtual network function is based, at least in part, upon the usage data.

6. The computer-readable storage medium of claim 4, wherein predicting the demand for the virtual network function is based, at least in part, upon a usage trend.

7. The computer-readable storage medium of claim 4, wherein predicting the demand for the virtual network function is based, at least in part, upon a scheduled event.

8. The computer-readable storage medium of claim 4, wherein predicting the demand for the virtual network function is based, at least in part, upon a cyclic event.

9. The computer-readable storage medium of claim 4, wherein predicting the demand for the virtual network function is based, at least in part, upon a condition of a hardware resource utilized, at least in part, by the virtual network function.

10. The computer-readable storage medium of claim 9, wherein the operations further comprise:
    detecting a failure of the hardware resource or detecting a failure of connectivity associated with the hardware resource; and
    in response to detecting the failure of the hardware resource or detecting the failure of connectivity associated with the hardware resource, moving the service to a new hardware resource.

11. A computer-readable storage medium comprising computer-executable instructions that, when executed by a cloud computing system, cause the cloud computing system to perform operations comprising:
    collecting data associated with a load experienced by a virtualized resource that provides, at least in part, a service;
    determining how to scale a virtualized resource pool that comprises the virtualized resource based, at least in part, upon a policy and the load;
    instructing an elasticity management component to scale the virtualized resource pool in accordance with a scaling decision regarding how to scale the virtualized resource pool; and
    scaling the virtualized resource pool to accommodate the load in accordance with the policy.

12. The computer-readable storage medium of claim 11, wherein collecting the data associated with the load comprises collecting the data from a monitoring component that monitors utilization of the virtualized resource pool.

13. The computer-readable storage medium of claim 11, wherein the policy comprises a threshold number of incoming connections to the service; and wherein determining how to scale the virtualized resource pool that comprises the virtualized resource based, at least in part, upon the policy and the load comprises determining whether a number of incoming connections at least meets the threshold number of incoming connections.

14. The computer-readable storage medium of claim 11, wherein determining how to scale the virtualized resource pool is further based upon a business rule.

15. A method comprising:
    collecting, by a cloud computing system comprising a processor, data associated with a load experienced by a virtualized resource that provides, at least in part, a service;
    determining, by the cloud computing system, how to scale a virtualized resource pool that comprises the virtualized resource based, at least in part, upon a policy and the load;
    instructing, by the cloud computing system, an elasticity management component to scale the virtualized resource pool in accordance with a scaling decision regarding how to scale the virtualized resource pool; and
    scaling the virtualized resource pool to accommodate the load in accordance with the policy.

16. The method of claim 15, wherein collecting the data associated with the load comprises collecting the data from a monitoring component that monitors utilization of the virtualized resource pool.

17. The method of claim 15, wherein the policy comprises a threshold number of incoming connections to the service;

and wherein determining how to scale the virtualized resource pool that comprises the virtualized resource based, at least in part, upon the policy and the load comprises determining whether a number of incoming connections at least meets the threshold number of incoming connections.

18. The method of claim 15, wherein determining how to scale the virtualized resource pool is further based upon a business rule.

19. The method of claim 15, wherein the load is associated, at least in part, with a mass calling event.

20. The method of claim 15, wherein the service comprises a real-time service; and wherein the policy is based upon a request queue length or a number of active calls.

* * * * *